US012634834B2

(12) United States Patent
Deghel et al.

(10) Patent No.: US 12,634,834 B2
(45) Date of Patent: May 19, 2026

(54) METHODS AND DEVICES FOR POWER CONTROL

(71) Applicant: Nokia Technologies Oy, Espoo (FI)

(72) Inventors: Matha Deghel, Massy (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 280 days.

(21) Appl. No.: 18/503,418

(22) Filed: Nov. 7, 2023

(65) Prior Publication Data

US 2024/0163806 A1     May 16, 2024

(30) Foreign Application Priority Data

Nov. 11, 2022     (GB) ...................................... 2216859

(51) Int. Cl.
*H04W 52/14*          (2009.01)
*H04W 52/32*          (2009.01)

(52) U.S. Cl.
CPC ....... *H04W 52/146* (2013.01); *H04W 52/325* (2013.01)

(58) Field of Classification Search
CPC ............. H04W 52/146; H04W 52/262; H04W 52/267; H04W 52/325; H04W 52/42
See application file for complete search history.

(56) References Cited

U.S. PATENT DOCUMENTS

2013/0235838 A1     9/2013   Kim et al.
2019/0215781 A1*    7/2019   Jeon .................... H04W 52/241

2019/0313348 A1*   10/2019   MolavianJazi ..... H04W 52/281
2024/0292412 A1*    8/2024   Seok ...................... H04W 72/21
2025/0168775 A1*    5/2025   Khoshnevisan .... H04W 52/346

FOREIGN PATENT DOCUMENTS

WO          2022/080911 A1     4/2022

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

(Continued)

*Primary Examiner* — Awet Haile
(74) *Attorney, Agent, or Firm* — McCarter & English, LLP

(57)          ABSTRACT

Embodiments of the present disclosure relate to methods and apparatus for uplink transmission power control. A terminal device obtains ratio information for power adjustment of at least one uplink transmission occasion of two or more uplink transmission occasions, wherein the two or more uplink transmission occasions at least partially overlap in a time domain and the ratio information indicates an adjustment factor for bits per resource element of the at least one uplink transmission occasion of the two or more uplink transmission occasions. The terminal device determines a power adjustment component for the at least one uplink transmission occasion of the two or more uplink transmission occasions at least partially based on the ratio information. In this way, efficient power control for simultaneous uplink transmissions can be achieved, thereby improving energy efficiency.

18 Claims, 4 Drawing Sheets

200

210

OBTAIN RATIO INFORMATION FOR POWER ADJUSTMENT OF AT LEAST ONE UPLINK TRANSMISSION OCCASION OF TWO OR MORE UPLINK TRANSMISSION OCCASIONS AT LEAST PARTIALLY OVERLAPPING IN A TIME DOMAIN

220

DETERMINE A POWER ADJUSTMENT COMPONENT FOR THE AT LEAST ONE UPLINK TRANSMISSION OCCASION AT LEAST PARTIALLY BASED ON THE RATIO INFORMATION

(56) References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"3rd Generation Partnership Project; Technical Specification Group Radio Access Network; NR; Physical layer procedures for data (Release 17)", 3GPP TS 38.214, V17.3.0, Sep. 2022, pp. 1-232.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Radio Access Network; NR; Multiplexing and channel coding (Release 17)", 3GPP TS 38.212, V17.3.0, Sep. 2022, pp. 1-201.

"New WID: MIMO Evolution for Downlink and Uplink", 3GPP TSG RAN Meeting #94e, RP-213598, Agenda: 8A. 1, Samsung, Dec. 6-17, 2021, 6 pages.

"3rd Generation Partnership Project; Technical Specification Group Radio Access Network; NR; Physical channels and modulation (Release 17)", 3GPP TS 38.211, V17.3.0, Sep. 2022, pp. 1-136.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.7.0, Sep. 2022, pp. 1-217.

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.7.0, Sep. 2022, pp. 1-1131.

"IEEE 802.11", Wikipedia, Retrieved on Dec. 1, 2023, Webpage available at : https://en.wikipedia.org/wiki/IEEE_802.11.

Search Report received for corresponding United Kingdom Patent Application No. 2216859.5, dated May 30, 2023, 3 pages.

"Consideration on power control of UL MIMO", 3GPP TSG RAN WG1 Meeting #66, R1-112708, Agenda: 6.7.3, ZTE, Aug. 22-26, 2011, pp. 1-6.

Extended European Search Report received for corresponding European Patent Application No. 23206866.8, dated Apr. 3, 2024, 8 pages.

Office action received for corresponding European Patent Application No. 23206866.8, dated Jul. 22, 2025, 3 pages.

* cited by examiner

100

200

210

OBTAIN RATIO INFORMATION FOR POWER ADJUSTMENT OF AT LEAST ONE UPLINK TRANSMISSION OCCASION OF TWO OR MORE UPLINK TRANSMISSION OCCASIONS AT LEAST PARTIALLY OVERLAPPING IN A TIME DOMAIN

220

DETERMINE A POWER ADJUSTMENT COMPONENT FOR THE AT LEAST ONE UPLINK TRANSMISSION OCCASION AT LEAST PARTIALLY BASED ON THE RATIO INFORMATION

300

310

DETERMINE RATIO INFORMATION FOR POWER ADJUSTMENT OF AT LEAST ONE UPLINK TRANSMISSION OCCASION OF TWO OR MORE UPLINK TRANSMISSION OCCASIONS AT LEAST PARTIALLY OVERLAPPING IN A TIME DOMAIN

320

TRANSMIT THE RATIO INFORMATION TO THE TERMINAL DEVICE

METHODS AND DEVICES FOR POWER CONTROL

CROSS-REFERENCE TO RELATED APPLICATION

This application claims priority to, and the benefit of, Great Britain application No. 2216859.5 filed on Nov. 11, 2022, which is incorporated herein by reference in its entirety.

FIELD

Various example embodiments relate to the field of telecommunication and in particular, to methods, devices, apparatuses and a computer readable storage medium for power control.

BACKGROUND

In wireless communication systems, a transmission power control is performed for the uplink (UL) transmission. Various mechanisms may be used for the UL transmission power control. For example, in a new radio (NR) system, for a physical uplink shared channel (PUSCH) transmission, parameters such as a closed-loop index, transmit power-control (TPC) command, path loss reference signal, etc. were defined for transmission power control.

In Rel-18, it is proposed to support simultaneous UL transmissions at least in or based on a spatial division multiplexing (SDM) scheme and single frequency network (SFN) scheme. For example, support for simultaneous transmission from multiple panels (STxMP) PUSCH transmissions based on multiple downlink control information (DCI) as well as based on single-DCI has been agreed. Thus, investigation of power control for the simultaneous UL transmissions is required for energy efficiency.

SUMMARY

In general, example embodiments of the present disclosure provide a solution for uplink transmission power control.

In a first aspect, there is provided a terminal device. The terminal device comprises at least one processor and at least one memory storing instructions that, when executed by the at least one processor, cause the terminal device at least to: obtain ratio information for power adjustment of at least one uplink transmission occasion of two or more uplink transmission occasions, wherein the two or more uplink transmission occasions at least partially overlap in a time domain; and determine a power adjustment component for the at least one uplink transmission occasion of the two or more uplink transmission occasions at least partially based on the ratio information, wherein the ratio information indicates an adjustment factor for BPRE of the at least one uplink transmission occasion of the two or more uplink transmission occasions.

In a second aspect, there is provided a network device. The network device comprises at least one processor; and at least one memory storing instructions that, when executed by the at least one processor, cause the network device at least to: determine, ratio information for power adjustment of at least one uplink transmission occasion of two or more uplink transmission occasions of a terminal device, wherein the two or more uplink transmission occasions at least partially overlap in a time domain; and transmit the ratio information to the terminal device, wherein the ratio information indicates an adjustment factor for bits per resource element, BPRE, of the at least one uplink transmission occasion of the two or more uplink transmission occasions.

In a third aspect, there is provided a method at a terminal device. The method comprises obtaining ratio information for power adjustment of at least one uplink transmission occasion of two or more uplink transmission occasions, wherein the two or more uplink transmission occasions at least partially overlap in a time domain; and determining, by the terminal device, a power adjustment component for the at least one uplink transmission occasion of the two or more uplink transmission occasions at least partially based on the ratio information; wherein the ratio information indicates an adjustment factor for bits per resource element, BPRE, of the at least one uplink transmission occasion of the two or more uplink transmission occasions.

In a fourth aspect, there is provided a method at a network device. The method comprises determining, by a network device, ratio information for power adjustment of at least one uplink transmission occasion of two or more uplink transmission occasions of a terminal device, wherein the two or more uplink transmission occasions at least partially overlap in a time domain; and transmitting, by the network device, the ratio information to the terminal device, wherein the ratio information indicates an adjustment factor for bits per resource element, BPRE, of the at least one uplink transmission occasion of the two or more uplink transmission occasions.

In a fifth aspect, there is provided an apparatus. The apparatus comprises: means for obtaining ratio information for power adjustment of at least one uplink transmission occasion of two or more uplink transmission occasions, wherein the two or more uplink transmission occasions at least partially overlap in a time domain; and means for determining a power adjustment component for the at least one uplink transmission occasion of the two or more uplink transmission occasions at least partially based on the ratio information, wherein the ratio information indicates an adjustment factor for bits per resource element, BPRE, of the at least one uplink transmission occasion of the two or more uplink transmission occasions.

In a sixth aspect, there is provided an apparatus. The apparatus comprises: means for determining ratio information for power adjustment of at least one uplink transmission occasion of two or more uplink transmission occasions of a terminal device, wherein the two or more uplink transmission occasions at least partially overlap in a time domain; and means for transmitting, by the network device, the ratio information to the terminal device, wherein the ratio information indicates an adjustment factor for bits per resource element, BPRE, of the at least one uplink transmission occasion of the two or more uplink transmission occasions.

In a seventh aspect, there is provided a terminal device. The terminal device comprises at least one processor; and at least one memory including computer program codes, wherein the at least one memory and the computer program codes are configured to, with the at least one processor, cause the terminal device to: obtain ratio information for power adjustment of at least one uplink transmission occasion of two or more uplink transmission occasions, wherein the two or more uplink transmission occasions at least partially overlap in a time domain; and determine a power adjustment component for the at least one uplink transmission occasion of the two or more uplink transmission occasions at least partially based on the ratio information, wherein the ratio information indicates an adjustment factor for BPRE of the at least one uplink transmission occasion of the two or more uplink transmission occasions.

In an eighth aspect, there is provided a network device. The network device comprises at least one processor; and at least one memory including computer program codes, wherein the at least one memory and the computer program codes are configured to, with the at least one processor, cause the network device to: determine, ratio information for power adjustment of at least one uplink transmission occasion of two or more uplink transmission occasions of a terminal device, wherein the two or more uplink transmission occasions at least partially overlap in a time domain; and transmit the ratio information to the terminal device, wherein the ratio information indicates an adjustment factor for bits per resource element, BPRE, of the at least one uplink transmission occasion of the two or more uplink transmission occasions.

In a ninth aspect, there is provided a non-transitory computer readable medium comprising program instructions for causing an apparatus to perform at least the method according to any one of the above third to fourth aspect.

In a tenth aspect, there is provided a computer program comprising instructions, which, when executed by an apparatus, cause the apparatus at least to: obtain, by a terminal device, ratio information for power adjustment of at least one uplink transmission occasion of two or more uplink transmission occasions, wherein the two or more uplink transmission occasions at least partially overlap in a time domain; and determine, by the terminal device, a power adjustment component for the at least one uplink transmission occasion of the two or more uplink transmission occasions at least partially based on the ratio information; wherein the ratio information indicates an adjustment factor for bits per resource element, BPRE, of the at least one uplink transmission occasion of the two or more uplink transmission occasions.

In an eleventh aspect, there is provided a computer program comprising instructions, which, when executed by an apparatus, cause the apparatus at least to: determine, by a network device, ratio information for power adjustment of at least one uplink transmission occasion of two or more uplink transmission occasions of a terminal device, wherein the two or more uplink transmission occasions at least partially overlap in a time domain; and transmit, by the network device, the ratio information to the terminal device, wherein the ratio information indicates an adjustment factor for bits per resource element, BPRE, of the at least one uplink transmission occasion of the two or more uplink transmission occasions.

In a twelfth aspect, there is provided a terminal device. The terminal device comprises: obtaining circuitry configured to obtain ratio information for power adjustment of at least one uplink transmission occasion of two or more uplink transmission occasions, wherein the two or more uplink transmission occasions at least partially overlap in a time domain; and determining circuitry configured to determine a power adjustment component for the at least one uplink transmission occasion of the two or more uplink transmission occasions at least partially based on the ratio information; wherein the ratio information indicates an adjustment factor for bits per resource element, BPRE, of the at least one uplink transmission occasion of the two or more uplink transmission occasions.

In a thirteenth aspect, there is provided a network device. The network device comprises: determining circuitry configured to determine ratio information for power adjustment of at least one uplink transmission occasion of two or more uplink transmission occasions of a terminal device, wherein the two or more uplink transmission occasions at least partially overlap in a time domain; and transmitting circuitry configured to transmit the ratio information to the terminal device, wherein the ratio information indicates an adjustment factor for bits per resource element, BPRE, of the at least one uplink transmission occasion of the two or more uplink transmission occasions.

In a fourteenth aspect, there is provided an apparatus. The apparatus comprises means for: obtaining ratio information for power adjustment of at least one uplink transmission occasion of two or more uplink transmission occasions, wherein the two or more uplink transmission occasions at least partially overlap in a time domain; and determining a power adjustment component for the at least one uplink transmission occasion of the two or more uplink transmission occasions at least partially based on the ratio information, wherein the ratio information indicates an adjustment factor for bits per resource element, BPRE, of the at least one uplink transmission occasion of the two or more uplink transmission occasions.

In a fifteenth aspect, there is provided an apparatus. The apparatus comprises means for: determining ratio information for power adjustment of at least one uplink transmission occasion of two or more uplink transmission occasions of a terminal device, wherein the two or more uplink transmission occasions at least partially overlap in a time domain; and transmitting, by the network device, the ratio information to the terminal device, wherein the ratio information indicates an adjustment factor for bits per resource element, BPRE, of the at least one uplink transmission occasion of the two or more uplink transmission occasions.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
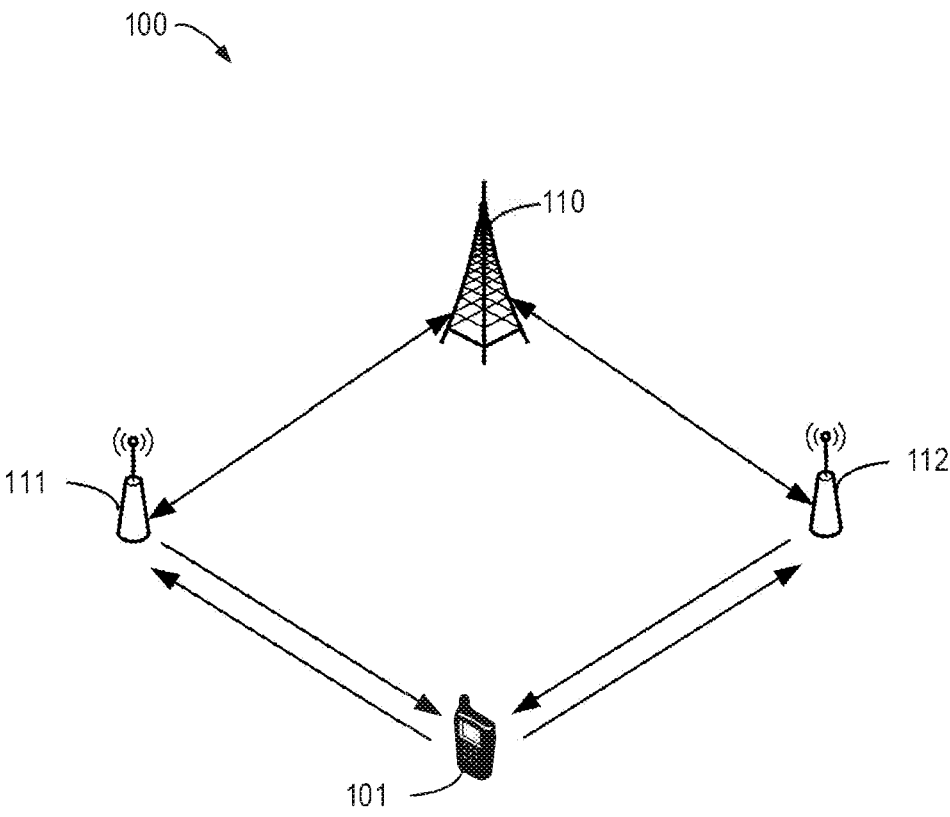
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G), or the further sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term transmission reception point (TRP) refers to a transmission reception point having an antenna array (with one or more antenna elements) at the network side located at a specific geographical location, which may be used for transmitting and receiving signals to/from the terminal device. In embodiment of the present disclosure, a TRP may refer to Macro Cell, micro cell, an RRH, a relay, a femto node, a pico node, etc. Although some embodiments of the present disclosure are described with reference to two TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As mentioned above, support of simultaneous UL transmissions at least in a SDM scheme may be specified in 3GPP Rel-18. For example, it has been agreed that two independent PUSCHs associated with different TRPs can be transmitted by UE simultaneously in a same active BWP. Thus, power control for the simultaneous UL transmissions, especially in a multi-TRP scenario, needs to be investigated.

In current mechanisms for uplink transmission power control, a power adjustment component is commonly used for determination of the transmission power. The power adjustment component may model how the required received power varies when the number of information bits per resource element (BPRE) changes due to different modulation schemes and channel-coding rates.

For example, TS 38.213 has specified, that if UE transmits a PUSCH on active UL bandwidth part (BWP) b of carrier $f$ of serving cell c using a parameter set configuration with index j and PUSCH power control adjustment state with index 1, the UE may determine the PUSCH transmission power $P_{PUSCH,b,f,c}(i, j, q_d, 1)$ in PUSCH transmission occasion i as $$P_{PUSCH,b,f,c}(i, j, q_d, l) = \tag{1}$$

$$\min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases} \text{[dBm]}$$

where
$P_{CMAX,f,c}(i)$ denotes the UE configured maximum output power defined in [8-1, TS 38.101-1], [8-2, TS 38.101-2] and [8-3, TS 38.101-3] for carrier $f$ of serving cell c in PUSCH transmission occasion i;
$P_{O\_PUSCH,b,f,c}(j)$ denotes a parameter composed of the sum of a component $P_{O\_NOMINAL,PUSCH,f,c}(j)$ and a component $$P_{O\_UE\_PUSCH,b,f,c}(j) \text{ where } j \in \{0, 1, \ldots, J-1\}; -M_{RB,p,f,c}^{PUSCH}(i)$$

denotes the bandwidth of the PUSCH resource assignment expressed in number of resource blocks for PUSCH transmission occasion i on active UL BWP b of carrier $f$ of serving cell c and $\mu$ is a SCS configuration defined in 3GPP TS 38.211;
$PL_{b,f,c}(q_d)$ denotes a downlink pathloss estimate in dB calculated by the UE using reference signal (RS) index $q_d$ for the active DL BWP of carrier $f$ of serving cell $$c; f_{b,f,c}(i, l) = f_{b,f,c}(i - i_0, l) + \sum_{m=0}^{C(D_i)-1} \delta_{PUSCH,b,f,c}(m, l)$$

denotes the PUSCH power control adjustment state 1 for active UL BWP b of carrier $f$ of serving cell c and PUSCH transmission occasion i if the UE is not provided tpc-Accumulation, $$\Delta_{TF,b,f,c}(i)$$

denotes a power adjustment component and is determined based on the following:

$$\Delta_{TF,b,f,c}(i) = 10\log_{10}\left(\left(2^{BPRE \cdot K_s} - 1\right) \cdot \beta_{offset}^{PUSCH}\right)$$

for $K_s = 1.25$ and $\Delta_{TF,b,f,c}(i) = 0$ for $K_s = 0$ where $K_s$ is provided by deltaMCS for each UL BWP b of each carrier $f$ and serving cell c. If the PUSCH transmission is over more than one layer, $\Delta_{TF,b,f,c}(i) = 0$.

$$BPRE \text{ and } \beta_{offset}^{PUSCH},$$

for active UL BWP b of each carrier $f$ and each serving cell c, are determined as below:

$$BPRE = \sum_{r=0}^{C-1} K_r / N_{RE}$$

for PUSCH with UL-SCH data and $$BPRE = Q_m \cdot R / \beta_{offset}^{PUSCH}$$

for CSI transmission in a PUSCH without UL-SCH data, where
C denotes a number of transmitted code blocks, $K_r$ denotes a size for code block r, and $N_{RE}$ denotes a number of resource elements determined as $$N_{RE} = N \cdot M_{RB,b,f,c}^{PUSCH}(i) \cdot \sum_{j=0}^{N_{symb,b,f,c}^{PUSCH}(i)-1} N_{sc,data}^{RB}(i, j),$$

where $N \geq 1$ is provided by numberOfSlotsTBoMS as described in 3GPP TS 38.214 and N=1 if numberOfSlotsT-BoMS is not provided, $$N_{symb,b,f,c}^{PUSCH}(i)$$

denotes a number of symbols for PUSCH transmission occasion i on active UL BWP b of carrier $f$ of serving cell $$c, N_{sc,data}^{RB}(i, j)$$

denotes a number of subcarriers excluding DM-RS subcarriers and phase-tracking RS samples in PUSCH symbol j and assuming no segmentation for a nominal repetition in case the PUSCH transmission is with repetition Type B, $$0 \leq j < N_{symb,b,f,c}^{PUSCH}(i),$$

and c, $K_r$ are defined in 3GPP TS 38.212.

$$\beta_{offset}^{PUSCH} = 1$$

when the PUSCH includes UL-SCH data and $$\beta_{offset}^{PUSCH} = \beta_{offset}^{CSI,1}$$

when the PUSCH includes CSI and does not include UL-SCH data $Q_m$ denotes the modulation order and R is the target code rate provided by the DCI format scheduling the PUSCH transmission that includes CSI and does not include UL-SCH data.

As can be seen from the above, the power adjustment component $\Delta_{TF,b,f,c}(i)$ for a PUSCH transmission is determined assuming that the PUSCH transmission carries a transport block (TB) by itself. For example, for a PUSCH transmission with UL-SCH data, the value of BPRE of the PUSCH transmission depends on a ratio of a sum of code-block sizes to a number of resource elements.

However, the above determination of the power adjustment component would not be valid or accurate when simultaneous UL transmissions are supported. For example, if two simultaneous UL transmissions are carrying a same TB(s), where one of the two transmissions is carrying one set of layers (i.e., one or more layers) of a codeword corresponding to the TB and the other transmission is carrying another set of layers of the same codeword, it would be inaccurate to use the sum of code-block sizes to determine the power adjustment component for either one of the two UL simultaneous transmissions.

According to embodiments of the present disclosure, there is provided a solution for uplink transmission power control. In this solution, a terminal device obtains ratio information for power adjustment of at least one uplink transmission occasion of two or more uplink transmission occasions. The two or more uplink transmission occasions at least partially overlap in a time domain. The ratio information indicates an adjustment factor for BPRE of the at least one uplink transmission occasion of the two or more uplink transmission occasions. With the obtained ratio information, the terminal device determines a power adjustment component for the at least one uplink transmission occasion of the two or more uplink transmission occasions at least partially based on the ratio information. In turn, the uplink transmission power may be determined more accurately based on the power adjustment component. In this way, efficient power control for simultaneous UL transmissions can be achieved, thereby improving energy efficiency.

As used herein, the term "simultaneous uplink transmissions" or "simultaneous UL transmissions" may refer to two or more UL transmissions that at least partially overlap in a time domain. In other words, either UL transmissions fully overlapping in the time domain or UL transmissions partially overlapping in the time domain belong to simultaneous uplink transmissions. Simultaneous UL transmissions may be performed in any different modes, such as a SDM scheme, a frequency division multiplexing (FDM) scheme, SFN scheme, etc. Considering that in simultaneous UL transmissions, a transmission is performed at a transmission occasion, and it is also a part of multiple simultaneous transmissions, the transmission may also be called as a transmission occasion, or a transmission part.

As used herein, the term "power adjustment component" may refer to a component for power adjustment in uplink power determination. The power adjustment component may model how the power varies for example due to different modulation schemes, coding rates and/or layers of at least one uplink transmission or transmission occasion. For example, in the above equation (1), the power adjustment component refers to component $\Delta_{TF,b,f,c}(i)$. It is to be appreciated that the term "power adjustment component" may also refer to a similar component for other different uplink power determination schemes from the equation (1).

Principle and embodiments of the present disclosure will be described in detail below with reference to the accompanying drawings. However, it is to be noted that these embodiments are illustrated as examples and not intended to limit scope of the present application in any way.

Reference is first made to FIG. 1, which illustrates an example communication network 100 in which embodiments of the present disclosure can be implemented. As illustrated in FIG. 1, the communication network 100 includes a network device (e.g. a base station) 110 and a terminal device (e.g. a user equipment) 101 served by the network device 110. The terminal device 101 can communicate with the network device 110 via one or more physical communication channels or links.

In the communication network 100, a link from the terminal device 101 to the network device 110 is referred to as an uplink (UL), while a link from the network device 110 to the terminal device 101 is referred to as a downlink (DL). The UL and DL can be collectively referred to as beam pair link. In UL, the terminal device 101 is a TX device (or a transmitter) and the network device 110 is a RX device (or a receiver). In DL, the network device 110 is a transmitting (TX) device (or a transmitter) and the terminal device 101 is a receiving (RX) device (or a receiver).

In a specific example of FIG. 1, in order to support multi-TRP and/or multi-panel, the network device 110 may be associated with one or more TRPs. For example, the network device 110 may be coupled with multiple TRPs in different geographical locations to achieve better coverage. One or more TRPs of the multiple TRPs may be associated with one network device or more network device and thus included in a same serving cell or different serving cells. It is to be understood that the TRP can also be a panel, and the panel can also refer to an antenna array (with one or more antenna elements).

As shown in FIG. 1, the network device 110 may communicate with the terminal device 101 via TRPs 111 and 112. The first and second TRPs 111 and 112 may be included in a same serving cell or different serving cells provided by the network device 110. As an example, in a multi-TRP scenario, the terminal device 101 may transmit two UL transmissions associated with respective TRPs 111 and 112 simultaneously.

It is to be understood that the numbers of network devices, terminal devices and/or TRPs are only for the purpose of illustration without suggesting any limitations to the present disclosure. The communication network 100 may include any suitable number of BSs, UEs and/or TRPs adapted for implementing implementations of the present disclosure.

It should be noted that the network device in the present disclosure may be control unit (CU) of a gNB, or it may be distributed unit (DU) of the gNB, or it may be gNB. TRP may be part of gNB, and TRP may be DU or part of DU. The present disclosure has not restriction of the implementation of the network device.

In some embodiments, the terminal device 101 may obtain, ratio information for power adjustment of at least one uplink transmission occasion of two or more uplink simultaneous transmission occasions and determine, a power adjustment component for the at least one uplink transmission occasion of the two or more uplink transmission occasions at least partially based on the ratio information. The ratio information indicates an adjustment factor for BPRE of the at least one uplink transmission occasion of the two or more uplink transmission occasions.

In some embodiments, the terminal device 101 may determine the ratio information based on a first number of layers associated with the at least one uplink transmission occasion and a total number of layers across the two or more uplink transmission occasions. In some embodiments, a network device, such as gNB, may determine and transmit the ratio information to the terminal device.

Communications in the communication system 100 may be implemented according to any proper communication protocol(s), comprising, but not limited to, the third generation (3G), the fourth generation (4G) and the fifth generation (5G) or beyond, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: code division multiple access (CDMA), frequency division multiple access (FDMA), time division multiple access (TDMA), frequency division duplex (FDD), time division duplex (TDD), multiple-input multiple-output (MIMO), orthogonal frequency division multiple (OFDM), discrete Fourier transform spread OFDM (DFT-s-OFDM) and/or any other technologies currently known or to be developed in the future.

Figure 2:
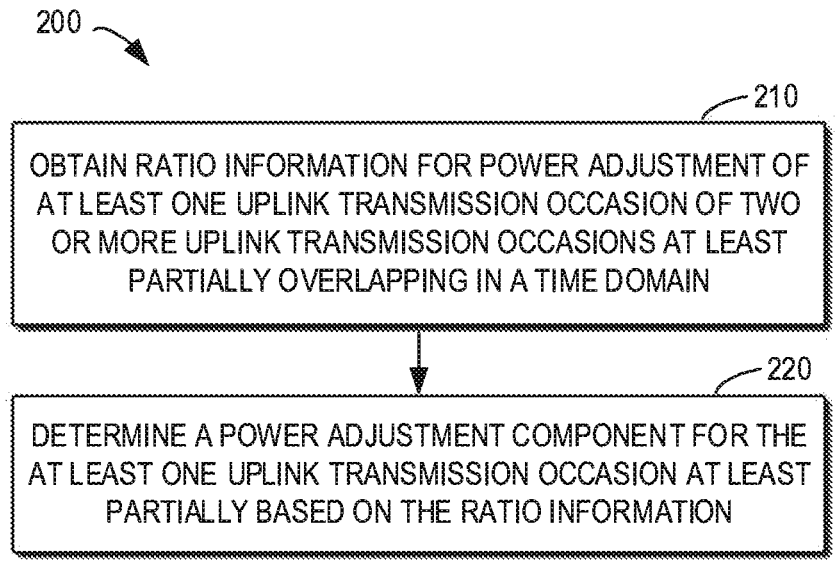
FIG. 2 illustrates an example flowchart of a method implemented at a terminal device according to some embodiments of the present disclosure.

Reference is now made to FIG. 2, which shows an example flowchart of a method 200 implemented at a terminal device according to some embodiments of the present disclosure. For the purpose of discussion, the method 200 will be described from the perspective of the terminal device 101 with reference to FIG. 1.

At block 210, the terminal device 101 obtains ratio information for power adjustment of at least one UL transmission occasion of two or more UL transmission occasions. The two or more UL transmission occasions at least partially overlap in a time domain, which may be also referred to as simultaneous UL transmission occasions. In other words, the ratio information may be used for adjusting the transmission power of at least one UL transmission occasion of simultaneous UL transmission occasions.

Specifically, the ratio information indicates an adjustment factor for BPRE of the at least one uplink transmission occasion of the two or more uplink transmission occasions. For example, the ratio information will be used as a factor to adjust the BPRE in power adjustment component $\Delta_{TF,b,f,c}(i)$ as used in equation (1).

In some embodiments, the two or more UL transmission occasions may include simultaneous uplink data transmission occasions. The simultaneous UL transmission occasions may include for example simultaneous PUSCH transmission occasions. For example, the terminal device 101 may transmit PUSCH-1 to the TRP 111 and transmit PUSCH-2 to the TRP 112 at the same time. The PUSCH-1 and PUSCH-2 may at least partially overlap in the time domain.

In some embodiments, the terminal device 101 may determine the ratio information based on a specified UE behavior. For example, the terminal device 101 may determine the ratio information based on a first number of layers associated with the at least one uplink transmission occasion and a total number of layers across the two or more uplink transmission occasions.

In other words, the ratio information for power adjustment of a first transmission occasion of the simultaneous UL transmission occasions may be determined based on a first number of layers associated with the first transmission occasion and a total number of layers across the simultaneous UL transmission occasions. Alternatively or additionally, the ratio information for power adjustment of a second transmission occasion of the simultaneous UL transmission occasions may be determined based on a second number of layers associated with the second transmission occasion and the total number of layers across the simultaneous UL transmission occasions.

In some embodiments, the terminal device 101 may determine a ratio of a first number of layers associated with a first transmission occasion to a total number of layers across the simultaneous transmission occasions as a first adjustment factor for the BPRE of the first transmission occasion. Alternatively or additionally, the terminal device 101 may determine a ratio of a second number of layers associated with a second transmission occasion to the total number of layers across the simultaneous transmission occasions as a second adjustment factor for the BPRE of the second transmission occasion.

For example, if PUSCH-1 of two simultaneous UL transmissions is over one layer and PUSCH-2 of the two simultaneous UL transmissions is over two layers, the number of total layers in the two simultaneous UL transmissions is three, i.e., (1+2). Therefore, the adjustment factor for PUSCH-1 may be determined as 1/(1+2) and the adjustment factor for PUSCH-2 may be determined as 2/(1+2). It is to be understood that in this example, there are only two simultaneous UL transmissions; however, the present disclosure is not limiter thereto. Instead, there may be more than two simultaneous UL transmission occasions e.g., PUSCH-1 over one layer, PUSCH-2 over two layers, and PUSCH-3 over two layers. In this case, the adjustment factor for PUSCH-1 may be determined as 1/(1+2+2), i.e., ⅕.

Additionally, the terminal device 101 may determine the adjustment factor based on one or more parameters other than the ratio. For example, the terminal device 101 may determine the adjustment factor for the BPRE of the UL transmission occasion based on the ratio and a link quality associated with the UL transmission occasion. Alternatively or alternatively, the terminal device 101 may determine the adjustment factor based on a further processing of the ratio. For example, the terminal device 101 may determine the adjustment factor by comparing the ratio with a threshold and determining the factor based on a result of the comparison.

In some embodiments, the terminal device 101 may obtain the ratio information by receiving the ratio information from a network device, e.g., network device 110. The ratio information may be contained in one or more of:

downlink control information, DCI, a medium access control control element, MAC CE, or a radio resource control, RRC, signaling.

At block 220, the terminal device 101, at least partially based on the obtained ratio information, determines a power adjustment component for the at least one UL transmission occasion of the simultaneous UL transmission occasions. For example, the terminal device 101 may determine one or more power adjustment components for one or more corresponding UL transmission occasions of the simultaneous UL transmission occasions.

The power adjustment component may be any suitable parameter for uplink transmission power control. The power adjustment component for a UL transmission occasion may depend on the BPRE of the UL transmission occasion. As a non-limiting example and as described earlier, the power adjustment component may model how the required received power varies when the BPRE changes due to e.g. different modulation schemes and/or layers of at least one uplink transmission.

In some embodiments, in order to determine the power adjustment component for a target UL transmission occasion of the simultaneous UL transmission occasions, the terminal device 101 may first determine a value of BPRE for the target UL transmission occasion and then determine the power adjustment component based on the value of BPRE parameter and the adjustment factor indicated by the ratio information.

The BPRE indicates the number of bits per resource elements. The value of BPRE may be determined through dividing a total number of information bits prior to encoding stage associated with the two or more uplink transmissions by a number of resource elements (REs) used for the simultaneous UL transmission occasions. The total number of information bits may refer to the number of bits after TB cyclic redundancy check (CRC) attachment and code block level CRC attachment (if applicable), or total size of code-block(s). The terminal device 101 may multiply the value of BPRE with the adjustment factor to derive a new parameter for determination of the power adjustment component.

In some embodiments, the BPRE and the power adjustment component may be defined similarly as in TS 38.213. For example, the power adjustment component may be defined as $$\Delta_{TF,b,f,c}(i) = 10\log_{10}\left(\left(2^{\mu\_0 BPRE \cdot K_s} - 1\right) \cdot \beta_{offset}^{PUSCH}\right) \text{ for } K_s = 1.25; \quad (2)$$

$$\text{and } \Delta_{TF,b,f,c}(i) = 0 \text{ for } K_s = 0$$

where $K_s$ is provided by deltaMCS for each UL BWP b of each carrier $f$ and serving cell c, and where $\mu\_0$ represents the adjustment factor for the corresponding UL transmission occasion.

In some embodiments, the terminal device 101 may determine the power adjustment component by determining a value of a scaled BPRE for a UL transmission occasion of the simultaneous UL transmission occasions based on the adjustment factor and then determining the power adjustment component based on the value of the scaled BPRE.

The terminal device 101 may first determine an original value of the BPRE for the UL transmission occasion and then determine the value of the scaled BPRE based on the original value of the BPRE and the adjustment factor. The terminal device 101 may multiply the original value of the BPRE with the adjustment factor to determine the value of the scaled BPRE for the UL transmission occasion. For example, the original value of BPRE may be first determined through dividing the total number of information bits prior to encoding stage associated with the simultaneous UL transmission occasions by the number of resource elements (REs) used for these simultaneous UL transmission occasions and then the original value of BPRE may be further scaled by the adjustment factor.

For illustrative purposes, an example power adjustment component and the scaled BPRE may be given as follows:

$$\Delta_{TF,b,f,c}(i) = 10\log_{10}\left(\left(2^{BPRE \cdot K_s} - 1\right) \cdot \beta_{offset}^{PUSCH}\right), \quad (3)$$

where $$BPRE = \mu\_0 \sum_{r=0}^{C-1} K_r / N_{RE}$$

represents the adjustment factor for the corresponding UL transmission occasion.

As an example, for PUSCH-1 of two simultaneous UL transmissions and PUSCH-2 of the two simultaneous UL transmissions, the power adjustment components for PUSCH-1 and PUSCH-2 may be determined based on their respective adjustment factors following any of the above equation (2) or (3).

In some embodiments, in addition to the adjustment factor, the terminal device 101 may determine the power adjustment component based on other information contained in the ratio information. In some embodiments, the ratio information may further indicate that the value of the power adjustment component is zero if the UL transmission occasion corresponds to a transmission over more than one layer.

For example, if PUSCH-1 of two simultaneous UL transmissions is over one layer and PUSCH-2 of the two simultaneous UL transmissions is over two layers, the power adjustment component for PUSCH-1 may be determined based on $\mu\_0 = 1/(1+2)$ and the power adjustment component for PUSCH-2 may be determined as zero.

In some embodiments, the two or more UL transmission occasions may correspond to transmissions in a SDM scheme. In other words, the two or more UL transmissions may be performed in or based on the SDM scheme. Alternatively, the two or more UL transmission occasions may also correspond to transmissions in a frequency division multiplexing (FDM) scheme. In a SDM scheme, a SFN scheme, or a FDM scheme, the two or more UL transmission occasions may partially or fully overlap in the time domain. In addition, the two or more UL transmission occasions may correspond to transmission in other transmission mode or scheme as long as it supports simultaneous transmissions.

In some embodiments, the two or more UL transmission occasions may correspond to transmissions carrying a same TB(s). In other words, the two or more UL transmission occasions are used to transmit the same TB. Alternatively, the two or more UL transmission occasions may correspond to transmissions carrying different TB s.

In some embodiments, the two or more UL transmission occasions may correspond to transmissions on two or more layers of a same codeword. For example, a first transmission occasion may correspond to a transmission on a first layer of a codeword, and a second transmission occasion may correspond to a second layer of the same codeword.

In some embodiments, the two or more UL transmission occasions may correspond to transmissions on two or more sets of layers of a same codeword. For example, a first transmission occasion may correspond to a transmission on a first set of layers of a codeword, and a second transmission occasion may correspond to a second set of layers of the same codeword. The first set of layers and the second set of layers may each comprise one or more layers.

In some embodiments, the two or more UL transmission occasions may be scheduled by a same physical downlink control channel (PDCCH). For example, the two or more UL transmission occasions may be scheduled by a same DCI.

In some embodiments, for a multi-TRP scenario, a unified transmission configuration indicator (TCI) framework may be used for providing a UL TCI state in a single DCI for scheduling the simultaneous UL transmission occasions.

In some embodiments, the two or more UL transmission occasions may correspond to a same configured-grant (CG) configuration. In other words, the two or more UL trans- mission occasions may share the same CG configuration, wherein the CG configuration is used to schedule transmis- sion resources for the uplink transmission. Alternatively, the two or more two or more UL transmission occasions may correspond to different CG configurations.

In some embodiments, the two or more UL transmission occasions may correspond to transmissions on a same com- ponent carrier (CC). Alternatively, the two or more UL transmission occasions may correspond to transmissions on different CCs. In some embodiments, the two or more UL transmission occasions may correspond to transmissions on a same bandwidth part (BWP). Alternatively, the two or more UL transmission occasions may correspond to trans- missions on different BWPs.

In this way, with the ratio information indicating the adjustment factor, the BPRE of the corresponding UL trans- mission occasion may be adjusted or scaled. This allows suitable scaling of the power adjustment component (and BPRE) for each UL transmission in case of simultaneous UL transmissions. In turn, the uplink transmission power may be determined accurately. Thus efficient power control for the simultaneous UL transmissions can be achieved, thereby improving energy efficiency.

Figure 3:
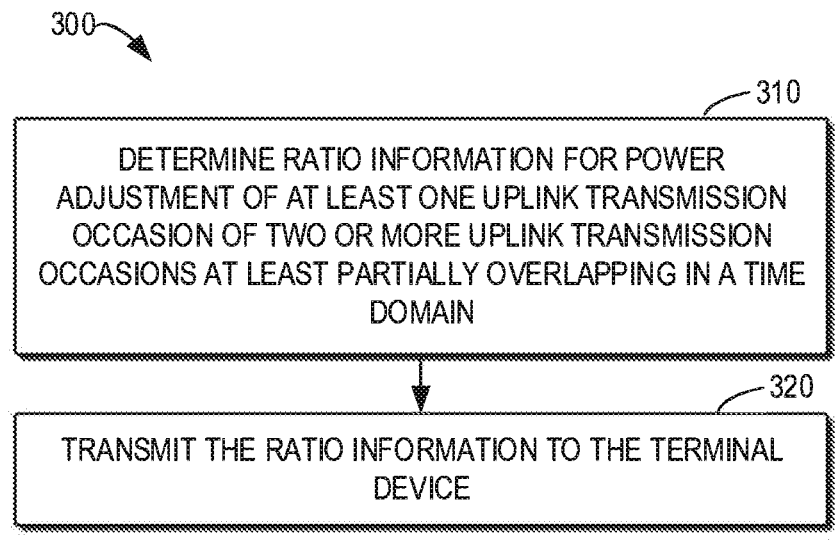
FIG. 3 illustrates an example flowchart of a method implemented at a network device according to some embodiments of the present disclosure.

FIG. 3 shows an example flowchart of a method 300 implemented at a network device in accordance with some embodiments of the present disclosure. For the purpose of discussion, the method 300 will be described from the perspective of the network device 110 with reference to FIG. 1.

As shown in FIG. 3, at block 310, the network device 110 may determine the ratio information for power adjustment of at least one uplink transmission occasion of two or more uplink transmission occasions of a terminal device. The ratio information indicates an adjustment factor for BPRE of the at least one uplink transmission occasion of the two or more uplink transmission occasions.

In some embodiments, the network device 110 may determine the ratio information based on a first number of layers associated with the at least one uplink transmission occasion and a total number of layers across the two or more uplink transmission occasions. It is to be understood that the network device 110 may also learn information on the layers associated with the simulations UL transmissions. There- fore, the network device may determine the ratio informa- tion based on the information on the layers, too. For example, the network device 110 may determine a ratio of the first number of layers to the total number of layers across the simultaneous UL transmission occasions as the adjust- ment factor for the BPRE.

Alternatively or additionally, the network device 110 may determine the ratio information based on a link quality (e.g., based on some reference signal measurements) associated with the two or more UL transmission occasions. The network device 110 may determine the ratio information based on one or more link qualities associated with one or more UL transmission occasions of the simultaneous trans- mission occasions. For example, the ratio may be increased for the adjustment factor for the BPRE of a UL transmission occasion associated with a low link quality, such that the power adjustment component for the UL transmission occa- sion may be increased.

Alternatively or additionally, the network device 110 may determine the ratio information based on a change in a link quality associated with the two or more UL transmission occasions. The network device 110 may determine the ratio information based on one or more changes in one or more link qualities associated with the simultaneous UL transmis- sion occasions. For example, the network device 110 may determine that a high value of the adjustment factor may be used for a UL transmission occasion associated with a decreasing link quality.

At block 320, the network device 110 transmits the ratio information indicating the adjustment factor to the terminal device 101. For example, the network device 110 may transmit the ratio information to the terminal device 101 via the TRP 111 and/or TRP 112. In some embodiments, the ratio information may be contained in a DCI. Alternatively or additionally, the ratio information may be contained in a medium access control-control element (MAC CE). Alter- natively or additionally, the ratio information may be con- tained in a radio resource control (RRC) signaling. In other words, the terminal device 101 may receive the ratio infor- mation via a DCI, MAC CE or RRC signaling. It's noted that the terminal device may be configured with ratio informa- tion per TRP or control resource set (CORESET) group or CORESETPoolIndex or TCI state or TCI state set or sound- ing reference signal (SRS) resource set or physical cell identity (PCI) ( ) or configured-grant configuration or num- ber of layers or range of layer numbers. The terminal device may then apply for an UL transmission (corresponding to a TRP or CORESET group or CORESETPoolIndex or TCI state set or SRS resource set or PCI or configured-grant configuration or number of layers or range of layer numbers) the corresponding ratio information (if applicable).

In some embodiments, an apparatus capable of perform- ing any of the method 200 (for example, the terminal device 101) may comprise means for performing the respective steps of the method 200. The means may be implemented in any suitable form. For example, the means may be imple- mented in a circuitry or software module.

In some embodiments, the apparatus comprises: means for obtaining ratio information for power adjustment of at least one uplink transmission occasion of two or more uplink transmission occasions, wherein the two or more uplink transmission occasions at least partially overlap in a time domain; and means for determining a power adjustment component for the at least one uplink transmission occasion of the two or more uplink transmission occasions at least partially based on the ratio information, wherein the ratio information indicates an adjustment factor for bits per resource element, BPRE, of the at least one uplink trans- mission occasion of the two or more uplink transmission occasions.

In some embodiments, the two or more uplink transmission occasions may correspond to transmissions on two or more layers of a same codeword. Alternatively, the two or more uplink transmission occasions may correspond to transmissions on two or more layer sets of a same codeword.

In some embodiments, the ratio information may be determined based on a first number of layers associated with the at least one uplink transmission occasion and a total number of layers across the two or more uplink transmission occasions.

In some embodiments, the means for obtaining the ratio information may comprise means for receiving the ratio information from a network device.

In some embodiments, the ratio information may be contained in one or more of: downlink control information, DCI, a medium access control control element, MAC CE, or a radio resource control, RRC, signaling.

In some embodiments, the means for determining the power adjustment component may comprise: means for determining a value of the BPRE for the at least one uplink transmission occasion; and means for determining the power adjustment component for the at least one uplink transmission occasion based on the value of the BPRE and the adjustment factor.

In some embodiments, the means for determining the power adjustment component may comprise: means for determining a value of a scaled BPRE for the at least one uplink transmission occasion based on the adjustment factor; and means for determining the power adjustment component based on the value of the scaled BPRE.

In some embodiments, the means for determining the value of the scaled BPRE may comprise: means for determining an original value of the BPRE; and means for determining the value of the scaled BPRE for the at least one uplink transmission occasion based on the original value of the BPRE and the adjustment factor.

In some embodiments, the at least one uplink transmission occasion may comprise a physical uplink shared channel (PUSCH) transmission occasion.

In some embodiments, the two or more uplink transmission occasions may correspond to transmissions in a spatial division multiplexing (SDM) scheme, a frequency division multiplexing (FDM) scheme, or a single frequency network (SFN) scheme.

In some embodiments, the two or more uplink transmission occasions may correspond to transmissions carrying a same transport block (TB).

In some embodiments, the two or more uplink transmission occasions may be scheduled by a same physical downlink control channel (PDCCH) or a same DCI.

In some embodiments, the two or more uplink transmission occasions may correspond to any of: a same configured-grant configuration; or different configured-grant configurations.

In some embodiments, the two or more uplink transmission occasions may correspond to transmissions on any of: a same component carrier (CC); a same bandwidth part (BWP); different CCs; or different BWPs.

In some embodiments, the apparatus further comprises means for performing other steps in some embodiments of the method 200. In some embodiments, the means comprises at least one processor; and at least one memory including computer program code, the at least one memory and computer program code configured to, with the at least one processor, cause the performance of the apparatus.

In some embodiments, an apparatus capable of performing any of the method 300 (for example, the network device 110) may comprise means for performing the respective steps of the method 300. The means may be implemented in any suitable form. For example, the means may be implemented in a circuitry or software module.

In some embodiments, the apparatus comprises: means for determining ratio information for power adjustment of at least one uplink transmission occasion of two or more uplink transmission occasions of a terminal device, wherein the two or more uplink transmission occasions at least partially overlap in a time domain; and means for transmitting, by the network device, the ratio information to the terminal device, wherein the ratio information indicates an adjustment factor for bits per resource element, BPRE, of the at least one uplink transmission occasion of the two or more uplink transmission occasions.

In some embodiments, the ratio information may be determined based on one or more of: a first number of layers associated with the at least one uplink transmission occasion and a total number of layers across the two or more uplink transmission occasions; a link quality associated with the two or more uplink transmission occasions; or a change in a link quality associated with the two or more uplink transmission occasions.

In some embodiments, the apparatus further comprises means for performing other steps in some embodiments of the method 300. In some embodiments, the means comprises at least one processor; and at least one memory including computer program code, the at least one memory and computer program code configured to, with the at least one processor, cause the performance of the apparatus.

Figure 4:
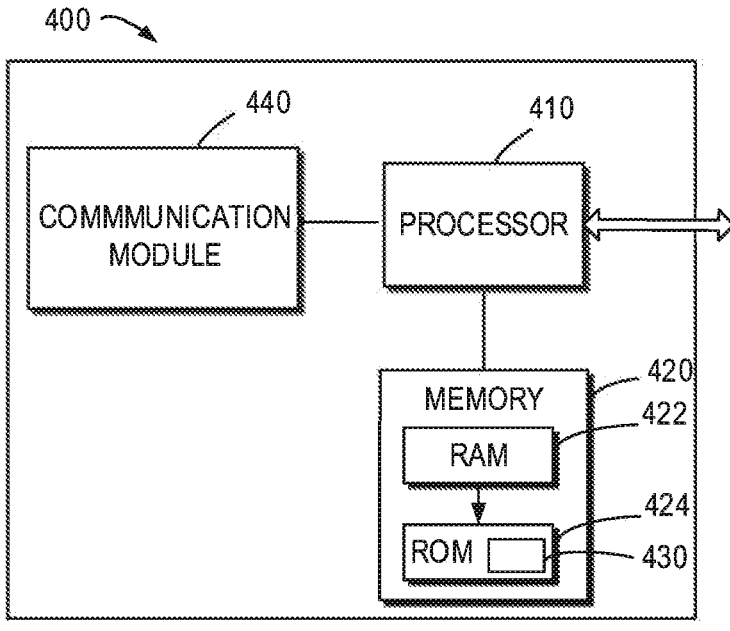
FIG. 4 illustrates an example simplified block diagram of an apparatus that is suitable for implementing embodiments of the present disclosure.

FIG. 4 is a simplified block diagram of a device 400 that is suitable for implementing embodiments of the present disclosure. The device 400 may be provided to implement the communication device, for example the terminal device 101, the network device 110, TRP 111 or TRP 112 as shown in FIG. 1. As shown, the device 400 includes one or more processors 410, one or more memories 440 coupled to the processor 410, and one or more communication modules 440 coupled to the processor 410.

The communication module 440 is for bidirectional communications. The communication module 440 has at least one antenna to facilitate communication. The communication interface may represent any interface that is necessary for communication with other network elements.

The communication module 440 may include for example one or more transceivers. The one or more transceivers may be coupled with one or more antennas, to wirelessly transmit and receive communication signals. The one or more transceivers allow the communication device to communicate with other devices that may be wired and/or wireless. The transceiver may support one or more radio technologies. For example, the one or more transceivers may include a cellular subsystem, a WLAN subsystem, and/or a Bluetooth subsystem. In some examples, the one or more transceivers may include processors, controllers, radios, sockets, plugs, buffers, and like circuits/devices used for connecting to and communication on networks.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 422 and other volatile memories that will not last in the power-down duration.

A computer program 430 includes computer executable instructions that are executed by the associated processor 410. The program 430 may be stored in the ROM 424. The processor 410 may perform any suitable actions and processing by loading the program 430 into the RAM 422.

The embodiments of the present disclosure may be implemented by means of the program 430 so that the device 400 may perform any process of the disclosure as discussed with reference to FIGS. 2 to 3. The embodiments of the present disclosure may also be implemented by hardware or by a combination of software and hardware.

Figure 5:
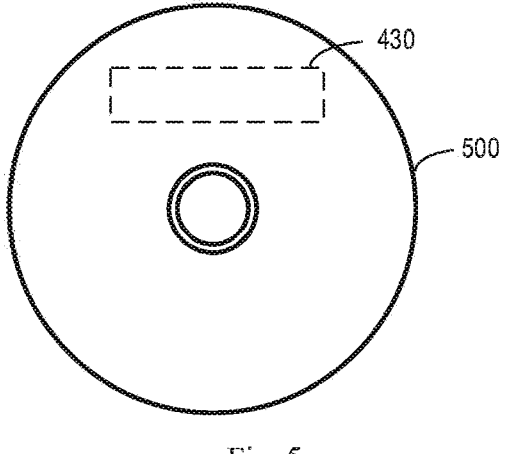
FIG. 5 illustrates a block diagram of an example computer readable medium in accordance with some embodiments of the present disclosure.

In some embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like. FIG. 5 shows an example of the computer readable medium 500 in form of CD or DVD. The computer readable medium has the program 430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or 300 as described above with reference to FIGS. 2-3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
one or more transceivers; and
one or more processors communicatively coupled to the one or more transceivers; and
one or more memories storing instructions that, when executed by the one or more processors, cause the terminal device to:

obtain ratio information for power adjustment of at least one uplink transmission occasion of two or more uplink transmission occasions, wherein the two or more uplink transmission occasions at least partially overlap in a time domain and concern multiple layers in a spatial division multiplexing scheme, wherein the ratio information is determined at least based on a first number of layers among the multiple layers associated with the at least one uplink transmission occasion and a total number of the multiple layers across the two or more uplink transmission occasions, wherein the first number is less than the total number;

determine a power adjustment component for the at least one uplink transmission occasion of the two or more uplink transmission occasions at least partially based on the ratio information;

wherein the ratio information indicates an adjustment factor for bits per resource element (BPRE) of the at least one uplink transmission occasion of the two or more uplink transmission occasions; and transmit in uplink using two or more layers of the multiple layers on the two or more uplink transmission occasions using at least the determined power adjustment component for the at least one uplink transmission occasion.

2. The terminal device of claim 1, wherein the two or more uplink transmission occasions correspond to transmissions from the terminal device on the two or more layers of the multiple layers of a same codeword; or wherein the two or more uplink transmission occasions correspond to transmissions from the terminal device on two or more layer sets of the multiple layers of a same codeword.

3. The terminal device of claim 1, wherein the ratio information is obtained by: receiving the ratio information from a network device.

4. The terminal device of claim 3, wherein the ratio information is contained in one or more of: downlink control information, a medium access control control element, or a radio resource control signaling.

5. The terminal device of claim 1, wherein determining the power adjustment component comprises:

determining a value of the BPRE for the at least one uplink transmission occasion; and determining the power adjustment component for the at least one uplink transmission occasion based on the value of the BPRE and the adjustment factor.

6. The terminal device of claim 1, wherein determining the power adjustment component comprises:

determining a value of a scaled BPRE for the at least one uplink transmission occasion based on the adjustment factor; and determining the power adjustment component based on the value of the scaled BPRE.

7. The terminal device of claim 6, wherein the terminal device is caused to determine the value of the scaled BPRE by:

determining an original value of the BPRE; and determining the value of the scaled BPRE for the at least one uplink transmission occasion based on the original value of the BPRE and the adjustment factor.

8. The terminal device of claim 1, wherein the at least one uplink transmission occasion comprises a physical uplink shared channel transmission occasion.

9. The terminal device of claim 1, wherein the two or more uplink transmission occasions correspond to transmissions carrying a same transport block.

10. The terminal device of claim 9, wherein the two or more uplink transmission occasions are scheduled by a same physical downlink control channel or a same downlink control information.

11. The terminal device of claim 9, wherein the two or more uplink transmission occasions correspond to any of: a same configured-grant configuration; or different configured-grant configurations.

12. The terminal device of claim 1, wherein the two or more uplink transmission occasions correspond to transmissions on any of: a same component carrier (CC); a same bandwidth part (BWP); different CCs; or different BWPs.

13. A network device, comprising:

one or more transceivers; and one or more processors communicatively coupled to the one or more transceivers; and one or more memories storing instructions that, when executed by the one or more processors, cause the network device to:

determine ratio information for power adjustment of at least one uplink transmission occasion of two or more uplink transmission occasions of a terminal device, wherein the two or more uplink transmission occasions at least partially overlap in a time domain and concern multiple layers in a spatial division multiplexing scheme, wherein the ratio information is determined at least based on a first number of layers among the multiple layers associated with the at least one uplink transmission occasion and a total number of the multiple layers across the two or more uplink transmission occasions, wherein the first number is less than the total number;

transmit the ratio information to the terminal device, wherein the ratio information indicates an adjustment factor for bits per resource element (BPRE) of the at least one uplink transmission occasion of the two or more uplink transmission occasions; and receiving information in uplink from the terminal device based on the two or more uplink transmission occasions.

14. The network device of claim 13, wherein the two or more uplink transmission occasions correspond to transmissions from the terminal device on two or more layers of the multiple layers of a same codeword; or wherein the two or more uplink transmission occasions correspond to transmissions from the terminal device on two or more layer sets of the multiple layers of a same codeword.

15. The network device of claim 13, wherein the two or more uplink transmission occasions are scheduled by a same physical downlink control channel or a same downlink control information.

16. The network device of claim 13, wherein the two or more uplink transmission occasions correspond to transmissions carrying a same transport block, and wherein the two or more uplink transmission occasions correspond to any of the following: a same configured-grant configuration; or different configured-grant configurations.

17. The network device of claim 13, wherein the ratio information is determined based on one or more of: a link quality associated with the two or more uplink transmission occasions; or a change in the link quality associated with the two or more uplink transmission occasions.

18. A method, comprising:

obtaining, by a terminal device, ratio information for power adjustment of at least one uplink transmission occasion of two or more uplink transmission occasions, wherein the two or more uplink transmission occasions at least partially overlap in a time domain and concern multiple layers in a spatial division multiplexing scheme, wherein the ratio information is determined at least based on a first number of layers among the multiple layers associated with the at least one uplink transmission occasion and a total number of the multiple layers across the two or more uplink transmission occasions, wherein the first number is less than the total number;

determining, by the terminal device, a power adjustment component for the at least one uplink transmission occasion of the two or more uplink transmission occasions at least partially based on the ratio information;

wherein the ratio information indicates an adjustment factor for bits per resource element of the at least one uplink transmission occasion of the two or more uplink transmission occasions; and transmitting in uplink using two or more layers of the multiple layers on the two or more uplink transmission occasions using at least the determined power adjustment component for the at least one uplink transmission occasion.

* * * * *